United States Patent [19]

Goetz

[11] 4,012,211
[45] Mar. 15, 1977

[54] FILTER FOR OCCUPANT RESTRAINT SYSTEM FLUID SUPPLY

[75] Inventor: George W. Goetz, Detroit, Mich.

[73] Assignee: Eaton Corporation, Cleveland, Ohio

[22] Filed: June 30, 1975

[21] Appl. No.: 591,911

[52] U.S. Cl. .................................. 55/485; 9/321; 23/281; 55/385 B; 55/487; 55/DIG. 5; 102/39; 210/141; 210/489; 280/740; 280/741

[51] Int. Cl.² ........................................ B01D 29/26

[58] Field of Search ............ 280/150 AB, 740, 741; 23/281, 252 R; 102/39; 55/485, 486, 385, 487, 488, 489, 498, 500, 276, DIG. 21, 527, DIG. 5; 60/219, 220; 149/2; 9/321; 138/171; 210/489, 497, 141

[56] References Cited

UNITED STATES PATENTS

| 1,212,844 | 1/1917 | Sweeney | 210/497 X |
|---|---|---|---|
| 1,685,246 | 9/1928 | Scaife | 138/171 X |
| 2,771,153 | 11/1956 | Henning | 55/487 X |
| 2,911,101 | 11/1959 | Robinson | 210/489 X |
| 3,026,609 | 3/1962 | Bryan | 55/527 X |
| 3,256,996 | 6/1966 | Porter et al. | 210/497 X |
| 3,442,392 | 5/1969 | Skelly | 55/DIG. 5 |
| 3,708,965 | 1/1973 | Domnick | 55/498 X |
| 3,797,854 | 3/1974 | Poole et al. | 60/220 |
| 3,800,945 | 4/1974 | Fowler | 210/489 X |
| 3,880,447 | 4/1975 | Thorn et al. | 23/281 X |
| 3,904,221 | 9/1975 | Shiki et al. | 280/150 AB |
| 3,912,458 | 10/1975 | Fukuma | 55/267 X |

FOREIGN PATENTS OR APPLICATIONS

| 2,325,310 | 12/1973 | Germany | 280/150 AB |
|---|---|---|---|
| 1,942,594 | 2/1971 | Germany | 55/527 |
| 649,057 | 1/1951 | United Kingdom | 210/497 |

Primary Examiner—Frank W. Lutter
Assistant Examiner—N. Greenblum
Attorney, Agent, or Firm—Teagno & Toddy

[57] ABSTRACT

A filter assembly is provided for a cylindrical radial flow fluid supply having a combustible gas generator which is used to inflate a confinement for an occupant restraint system upon the occurrencee of a collision. The filter assembly includes a plurality of layers of filter material and support elements pressed to a densely packed flat form, rolled, closed, and inserted in the housing of the fluid supply adjacent the combustible gas generator.

11 Claims, 4 Drawing Figures

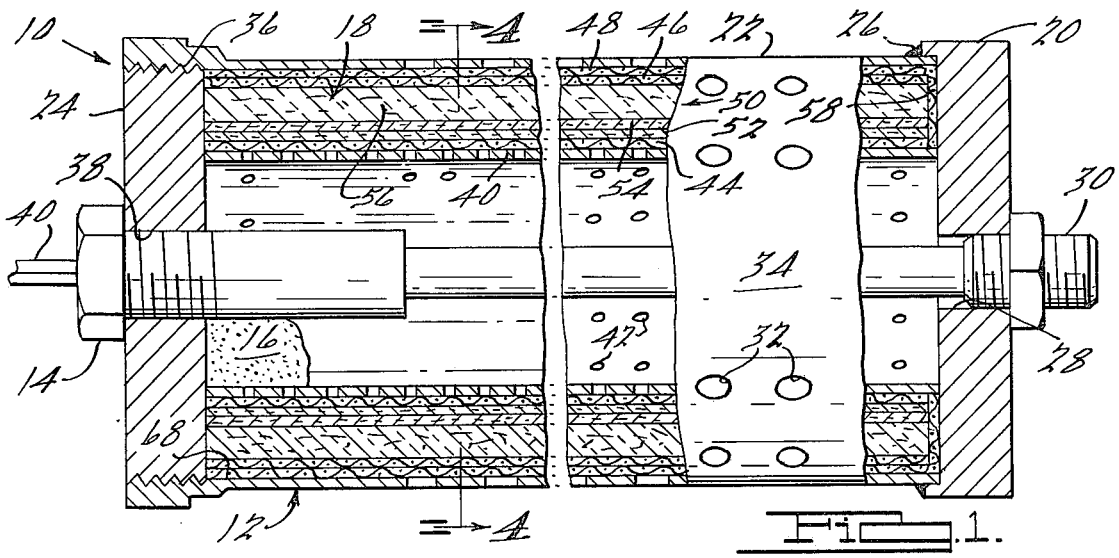
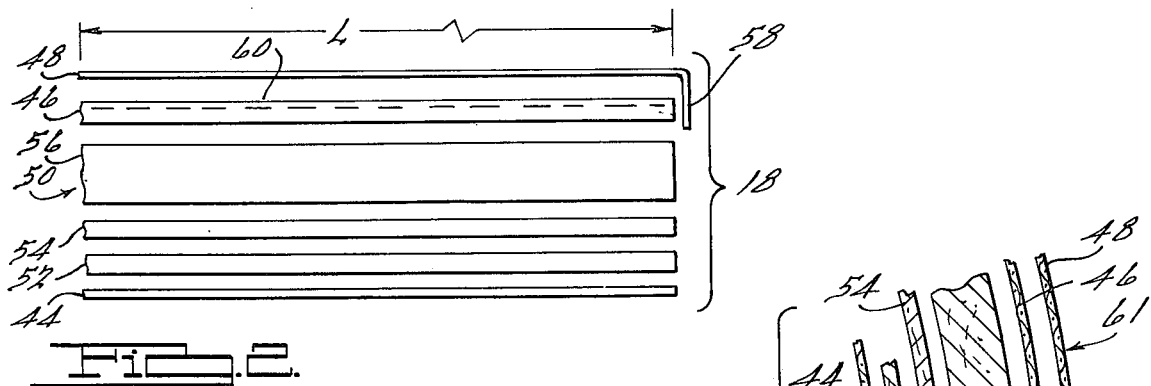
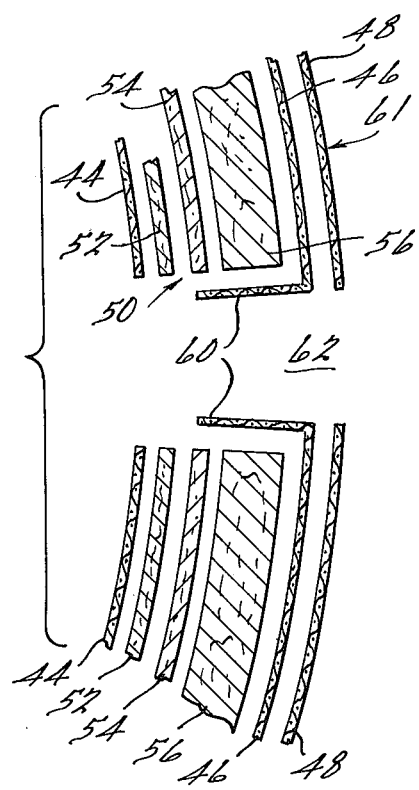
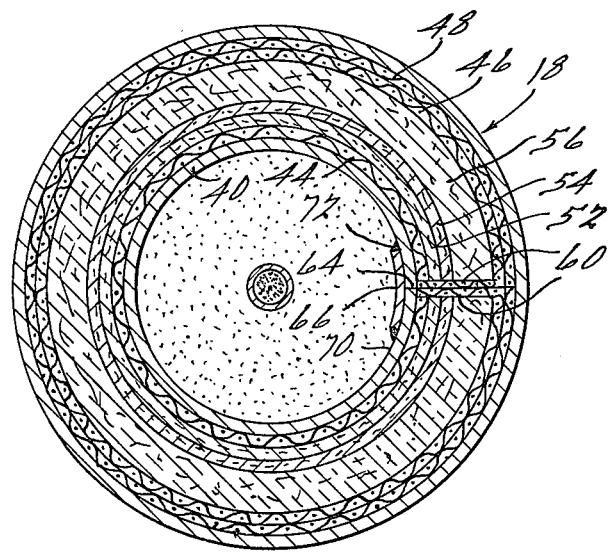

FILTER FOR OCCUPANT RESTRAINT SYSTEM FLUID SUPPLY

BACKGROUND OF THE INVENTION

1. Field of the Invention

The present invention relates generally to fluid supplies for vehicle occupant restraint systems and more specifically to filters for use therein and to methods of assembling those filters.

2. Description of the Prior Art

Filter assemblies for vehicle occupant restraint system fluid supplies are known in the prior art. See, for example, prior application Ser. No. 539,220 filed Jan. 8, 1975 of Applicant G. W. Goetz and R. G. Gehrig assigned to the assignee of the present invention which relates to a filter for an axial flow gas generator, and German application No. 2,325,310, filed May 18, 1973 of Shiki et al issued Dec. 6, 1975.

Certain problems have been encountered in the construction and use of such filters in fluid supplies of the cylindrical radial flow type which utilizes combustible gas generation. One problem is the tendency of the products of combustion of the gas generators to clog the filters.

Another problem encountered is that of maintaining uniform density and porosity of the filter media of the filter assembly when it is formed as a cylinder for use in a cylindrical, radial flow fluid supply.

Still another problem is the difficulty of effecting axial and radial closure of the filter assembly to prevent both movement of the filter material out of the filter assembly during assembly and/or operation of the filter and the bypassing of the filter by gas and products of combustion during operation.

Yet another problem is the high cost of construction of cylindrical filter assemblies and of assembling such assemblies into the housing of the fluid supply.

SUMMARY OF THE INVENTION

It is an object of the present invention to provide an improved filter for a cylindrical radial flow occupant restraint system fluid supply which minimizes clogging by products of combustion of the fluid supply gas generator.

It is another object of the invention to provide a method of assembling a cylindrical radial flow filter whereby uniform density of the filter media is maintained and whereby movement of filter media during operation is prevented.

It is a further object to effect closure of the filter assembly to prevent bypassing of the filter during operation and movement of filter material out of the filter during assembly or operation.

It is a still further object to provide a cylindrical filter assembly for a radial flow fluid supply of a vehicle occupant restraint system that is simple and economical to produce and assemble.

According to one feature of the filter of the present invention a plurality of layers of filter material carried between supporting screens and pressed into a flat filter pack and subsequently rolled to form a cylindrically shaped filter thereby providing an inexpensive filter assembly in which clogging is minimized and filter material has uniform density. The filter of the present invention is particularly suitable for use in the fluid supply described in the application (Ser. No. 591,910) of George W. Goetz entitled "Fluid Generator" filed concurrently herewith and assigned to the assignee of the present invention.

According to another feature, means are provided for closing the edges of the filter pack thereby preventing movement of the filter material during assembly and operation and further preventing bypassing of the filter during operation.

BRIEF DESCRIPTION OF THE DRAWINGS

These objects and features, as well as others, will become apparent to those skilled in the art of vehicle occupant restraint systems upon reading the accompanying description with reference to the drawings in which:

FIG. 1 is a fragmentary cross sectional view of the housing of a fluid supply including the filter assembly of the present invention;

FIG. 2 is an exploded fragmentary cross sectional view of the filter assembly of the present invention prior to its being formed to cylindrical shape;

FIG. 3 is an exploded fragmentary cross sectional view of the filter assembly of the present invention formed to cylindrical shape; and FIG. 4 is a fragmentary cross sectional view of the filter assembly of the present invention taken along line 4—4 of FIG. 1.

DESCRIPTION OF THE PREFERRED EMBODIMENT

Referring now to FIG. 1 a fluid supply 10 is illustrated as including a cylindrical housing assembly 12, an igniter assembly 14, means 16 for generating gas for inflation through combustion, and a filter assembly 18 disposed between the gas generating means 16 and the housing 12.

The housing assembly 12 includes a base portion 20, a fluid direction portion 22, and an end cap 24. Base portion 20 is preferably secured to one end of the fluid directing portion 22 by welding or the like as illustrated at 26 and carries one end of the igniter assembly 14 in a centrally located bore 28 closed by a plug 30.

Fluid directing portion 22 defines a generally cylindrical shell through which a multiplicity of axially and circumferentially spaced ports 32 are formed. Two diametrically opposed circumferential sections, however, one of which is indicated generally at 34, is unperforated and extends the entire length of the fluid directing portion 22.

The end of portion 22 opposite the base portion 20 is illustrated as being internally threaded at 36 to receive the end cap 24 which is externally threaded.

The igniter assembly 14 is threadedly received in a centrally located internally threaded bore 38 in the end cap 24. The igniter assembly 14 may be of any known design but is illustrated in FIG. 1 as being of the type including electrical leads 40 for receiving a signal from a crash sensor (not shown) upon the occurrence of a collision.

The gas generating means 16 comprises suitable combustible material filling the space between the igniter assembly 14 and the filter assembly 18. While other combustible materials may be chosen, that having a granular solid form and composition as disclosed by applicant in his U.S. application Ser. No. 528,199, filed Nov. 29, 1974 and assigned to the assignee of the present invention is preferred. The particular arrangement of the gas generating material is preferably as set forth in the above referenced concurrent application of G. W. Goetz.

The filter assembly 18 is formed in a substantially cylindrical configuration and is illustrated as including inner support means comprising a relatively thin perforated plate 40 having formed through it a plurality of axially and radially spaced holes 42 and an inner support screen 44, and outer support means comprising first and second outer support screens 46 and 48, respectively, and a plurality of layers of deformable fibrous filter material 50.

The components of the filter assembly 18 are arranged in the order of their decreasing porosity in the flow direction as taught in the U.S. application Ser. No. 539,220 of Applicant and R. G. Gehrig, filed Jan. 1, 1975, and assigned to the assignee of the present invention. Inner support screen 44 is adjacent the perforated plate 40 and has a relatively high porosity and National Bureau of Standards mesh number, U.S. Standard testing sieve, market grade or equivalent such as No. 24. First outer support screen 46 is formed of a woven screen fabric having a relatively high resistance to mechanical deformation but a relatively low porosity such as No. 24 × 110 Dutch Weave. Second outer support screen 48 from a still more porous screen fabric such as No. 8 mesh.

The layers 50 of filter material are illustrated here as including a first layer of steel wool 52 less porous than the inner support screen 44, being formed of a material such as is commonly referred to as No. 0 steel wool, a second layer of steel wool 54, still less porous, being formed of a material such as No. 0000 steel wool, and a layer 56 of high temperature washed fiberglas the diameter of the fibers of which is in the range of two to ten microns. An example of such a material is that sold under the trade name "LoCon" by Carborundum Corp., P.O. Box 339, Niagra Falls, New York 14302. The layer 56 is less porous than the steel wool layers and supported by the first outer screen 46.

It will be obvious to those skilled in the art that other filter materials may be chosen as is discussed in the previously referenced application Ser. No. 539,220 without departing from the spirit of the present invention.

In an alternative embodiment, not illustrated in the drawings, the fiberglas layer may be relatively thick, and may comprise a plurality of layers of fiberglas of varying porosity, and an additional screen, more porous than the fiberglas may be interposed at the approximate midpoint of the layer to provide additional support if desired.

FABRICATION AND INSTALLATION OF THE FILTER ASSEMBLY

To form the filter assembly 18, the support screens 44, 46, and 48, and the layers 50 of deformable fibrous filter material are first fabricated as substantially rectangular sheets of equal length denoted by reference letter -L- in FIG. 2 and having widths increasing proportionally with their distance from the central axis of the housing assembly 12, as viewed in FIG. 1.

The sheet forming second outer support screen 48 includes an inwardly extending flange portion 58 at one end to facilitate insertion into the housing assembly 12.

The sheet forming the first outer support screen 46 includes inwardly extending flange portions 60 on each longitudinal edge to effect closure of the filter assembly.

After fabrication the sheets are arranged in a flat pack shown in FIG. 2 and placed in a press wherein a high compressive force is applied. Applicant has found that a high degree of compression is required to retard movement of the filter material during operation of the fluid supply. For that reason a force in the range of 45 to 55 tons is applied to the sheets to compress them to a thickness equal to the length of the downward (as viewed in FIG. 2) extension of flange portion 60 which serves as a barrier to the movement of the layers 50 of deformable fibrous filter material.

Referring now to FIG. 3, the resulting compressed rectangular filter pack is subsequently formed by rolling or like process into a resilient cylinder 61 having a transverse dimension, in its radially compressed condition, less than the inner diameter 68 of the housing assembly 12 and having an open longitudinal seam 62 at the interface between the flange portions 60. The barrier effect of the flange portions 60 together with the maintaining of a uniform thickness in the fabrication of the filter back insures uniform distribution of the compressed filter material.

The perforated plate 40, which may be fabricated first as a rectangular sheet, is rolled or otherwise processed to form a cylinder (as may best be seen in FIG. 4) whose longitudinal seam 64 is closed by fixing a thin plate 66 to the inner diameter 70 of the perforated plate 40 at the seam 64 by weldments 72 or the like and whose inner diameter 70 is sized to receive the gas generating means 16.

To prepare the filter assembly 18 for installation in the typical radial flow generator housing 12 the perforated plate 40 is first placed within the resilient cylinder 61. The cylinder 61 is then radially loaded by means of a fixture (not shown) which is configured to allow sliding movement of the cylinder 61 with respect thereto. The longitudinal axis of cylinder 61 is then aligned with the longitudinal axis of the housing 12, and the seam 62 is circumferentially aligned with one of the unperforated sections 34. An axial load is then applied to the filter assembly 18 to slide it out of the fixture into the housing 12, with inwardly extending flange portion 58 of second outer screen 48 providing a relatively smooth leading edge to facilitate insertion. In order to further aid insertion, the housing 12 may be vibrated to effectively reduce the frictional forces acting between the filter assembly 18 and the inner surface of housing 12.

When installed as described in FIG. 1 the filter assembly 18 effects filtration of the products of combustion of the gas generating means 16 which are released to flow outward through fluid directing passages 32 in the housing 12 when the gas generating means 16 is actuated by the igniter assembly 14 upon the occurrence of a collision. Gaseous products flow outward from the gas generating means 16 through holes 42 in the perforated plate 40, bypassing being prevented by the plate 66. Filtration of the solid products of the combustion is effected during passage through the screen 44, and the layers of filter material 50. Bypassing of these portions of the filter assembly 18 is prevented through the positioning of the seam 62.

Although the filter assembly of the present invention has been described in two embodiments, other embodiments and modifications may be constructed without departing from the spirit of the invention as presently claimed:

What is claimed is:

1. A filter for a radially outward flow gas generator comprising:
    a radially resilient tubular assembly having a longitudinal slit formed therein extending the length thereof, and including:
    a. fluid permeable outer support means;
    b. inner support means formed of fluid permeable material and disposed radially inwardly of said outer support means and including means for longitudinally closing the radially inward end of said slit to prevent the passage of gas through the slit; and
    c. a plurality of layers of generally tubular concentric deformable fibrous filter material, disposed between said inner and outer support means each having longitudinal slits which are aligned with one another such that they all lie in substantially the same plane, said sheets being adapted to effect filtration of the combustion products of the gas generator.

2. The filter as defined in claim 1 wherein said inner support means comprises:
    d. a thin perforated plate formed as a tubular member having a longitudinal seam formed therein extending the length thereof and defining the inward end of said slit and registering with said slit, and wherein said means for closing comprises a thin plate secured to the inner periphery of said tubular member to cover said seam, and
    e. an inner support screen disposed between said perforated plate and said layers of deformable fibrous material, said screen being formed of a material less porous than said perforated plate.

3. The filter as defined in claim 2 wherein said inner support screen is formed from a screen material having a Mesh Number of 24.

4. The filter as defined in claim 1 wherein said outer support means includes an inwardly extending flange portion formed on one end thereof whereby closure of one end of said filter is effected.

5. The filter as defined in claim 1 wherein said outer support means comprises a first, outer screen formed from a deformable material, and a second, inner screen formed from a less deformable material and being less porous than said outer screen.

6. The filter as defined in claim 5 wherein said outer screen is formed from a screen material having a Mesh Number of 8.

7. The filter as defined in claim 1 wherein inwardly extending flange portions are formed at the edges of said outer support means adjacent said longitudinal slit which are inserted into said slit for effecting closure of said slit to prevent circumferential movement of said layers of filter material.

8. The filter as defined in claim 1 wherein said layers of deformable material comprises:
    f. a plurality of layers of steel wool being less porous than said inner support means and disposed adjacent said inner support means,
    g. a plurality of layers of fiberglas being less porous than said steel wool layers and disposed between said layers of steel wool and said outer support means.

9. The filter as defined in claim 8 wherein said layers of steel wool comprise:
    h. a first, inner layer of No. 0 steel wool, and
    i. a second, outer layer of No. 0000 steel wool.

10. The filter as defined in claim 8 wherein said layers of fiberglas comprised high temperature washed fiberglas, the diameter of whose fibers is in the range of 2 to 10 microns.

11. The filter as defined in claim 8 and further comprising a support screen disposed intermediate two of said layers of fiberglas and being more porous than said layers of fiberglas.

* * * * *